United States Patent [19]

Comerford et al.

[11] Patent Number: 5,269,004
[45] Date of Patent: Dec. 7, 1993

[54] SYSTEM FOR INTEGRATING POINTING FUNCTIONS INTO COMPUTER KEYBOARD WITH LATERAL MOVEMENT OF KEYSWITCH MOUNTING PLATE CAUSING STRAIN AND CONTROL SIGNAL

[75] Inventors: Liam D. Comerford, Carmel; Joseph J. Laibinis, Hopewell Junction, both of N.Y.

[73] Assignee: International Business Machines Corporation, Armonk, N.Y.

[21] Appl. No.: 545,255

[22] Filed: Jun. 28, 1990

[51] Int. Cl.⁵ ............................................. G06F 3/02
[52] U.S. Cl. .................................... 395/275; 341/22; 364/234; 364/236.8; 364/237.2; 345/168
[58] Field of Search ............... 395/800, 275; 341/22; 340/711, 709

[56] References Cited

U.S. PATENT DOCUMENTS

| | | | |
|---|---|---|---|
| 4,357,646 | 11/1982 | McVey et al. | 361/288 |
| 4,680,577 | 7/1987 | Straayer et al. | 340/711 |
| 4,826,123 | 5/1989 | Hannah et al. | 248/248 |
| 4,857,840 | 8/1989 | Lanchais | 324/207 |
| 4,899,137 | 2/1990 | Behrens et al. | 340/711 |
| 5,034,740 | 7/1991 | Acher | 341/33 |
| 5,036,743 | 8/1991 | Yamaguchi et al. | 84/434 |
| 5,124,689 | 6/1992 | Franz et al. | 340/711 |

*Primary Examiner*—Lawrence E. Anderson
*Assistant Examiner*—Mehmet Geckil
*Attorney, Agent, or Firm*—Jack M. Arnold

[57] ABSTRACT

A device providing pointing device functions in a keyboard without requiring the keyboard operator to remove any fingertip from the keys. A computer keyboard keyswitch mounting plate is supported for horizontal displacement against a resistive force. A transducer for measuring the force exerted in the plane of the keyboard key tops is attached between the keyboard case and the keyswitch mounting plate. The direction and magnitude of the force can be measured and encoded so they may be used to emulate the signals generated by a pointing device. The operator may elect a pointing device mode by merely applying sufficient force along the plane of the surface of the key tops, thus switching from a keyboard mode to a pointing device mode, without moving the fingers from a typing position.

11 Claims, 7 Drawing Sheets

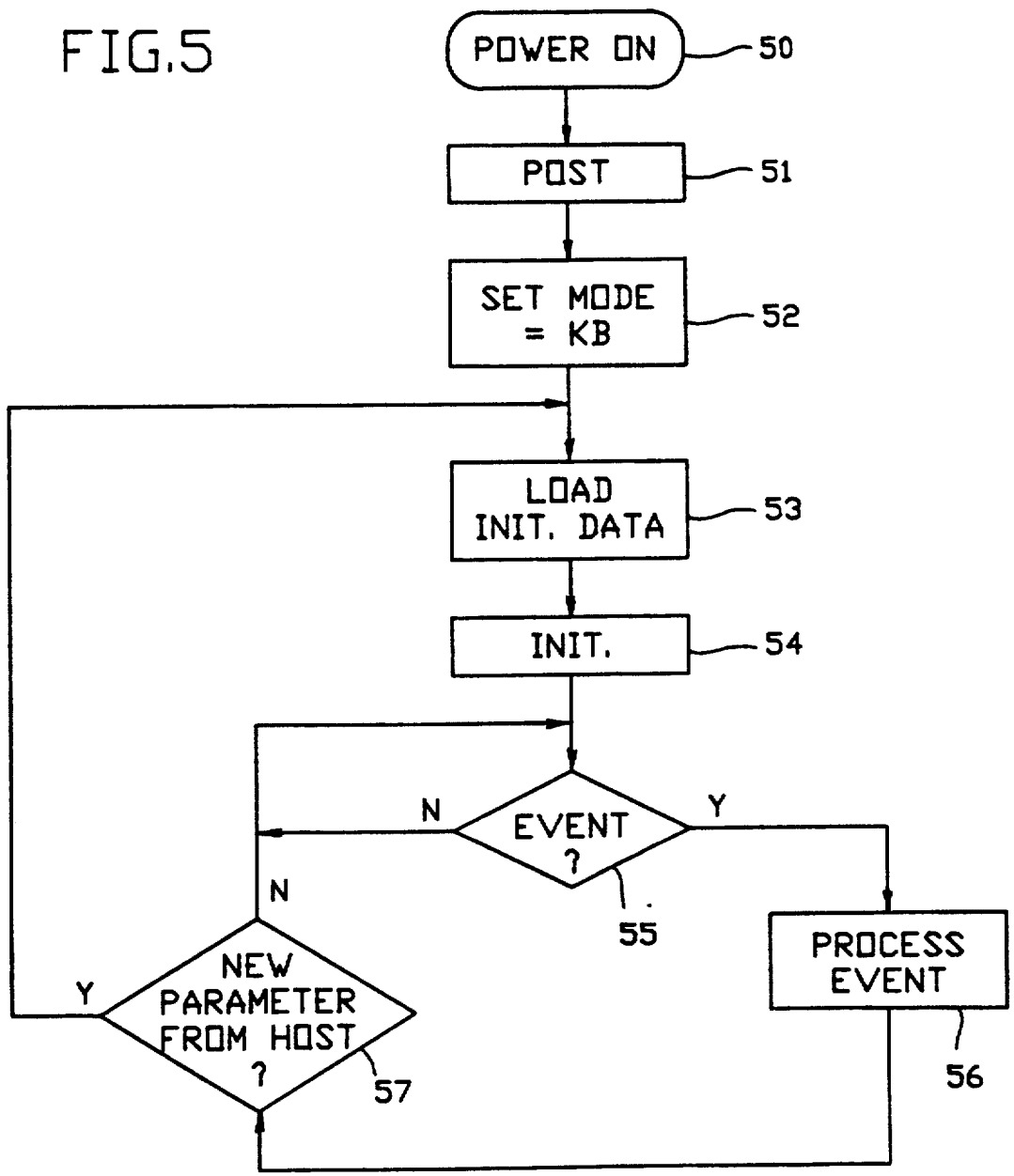

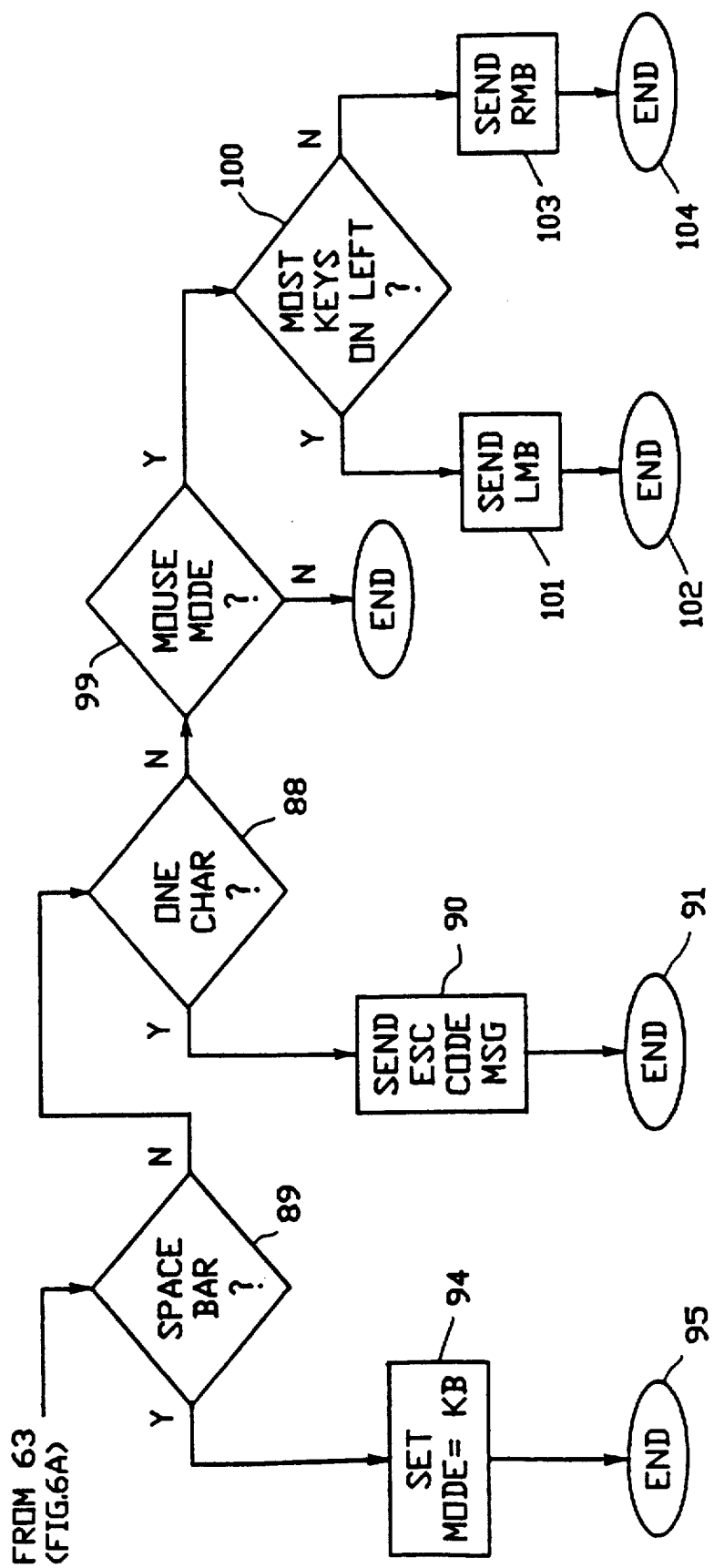

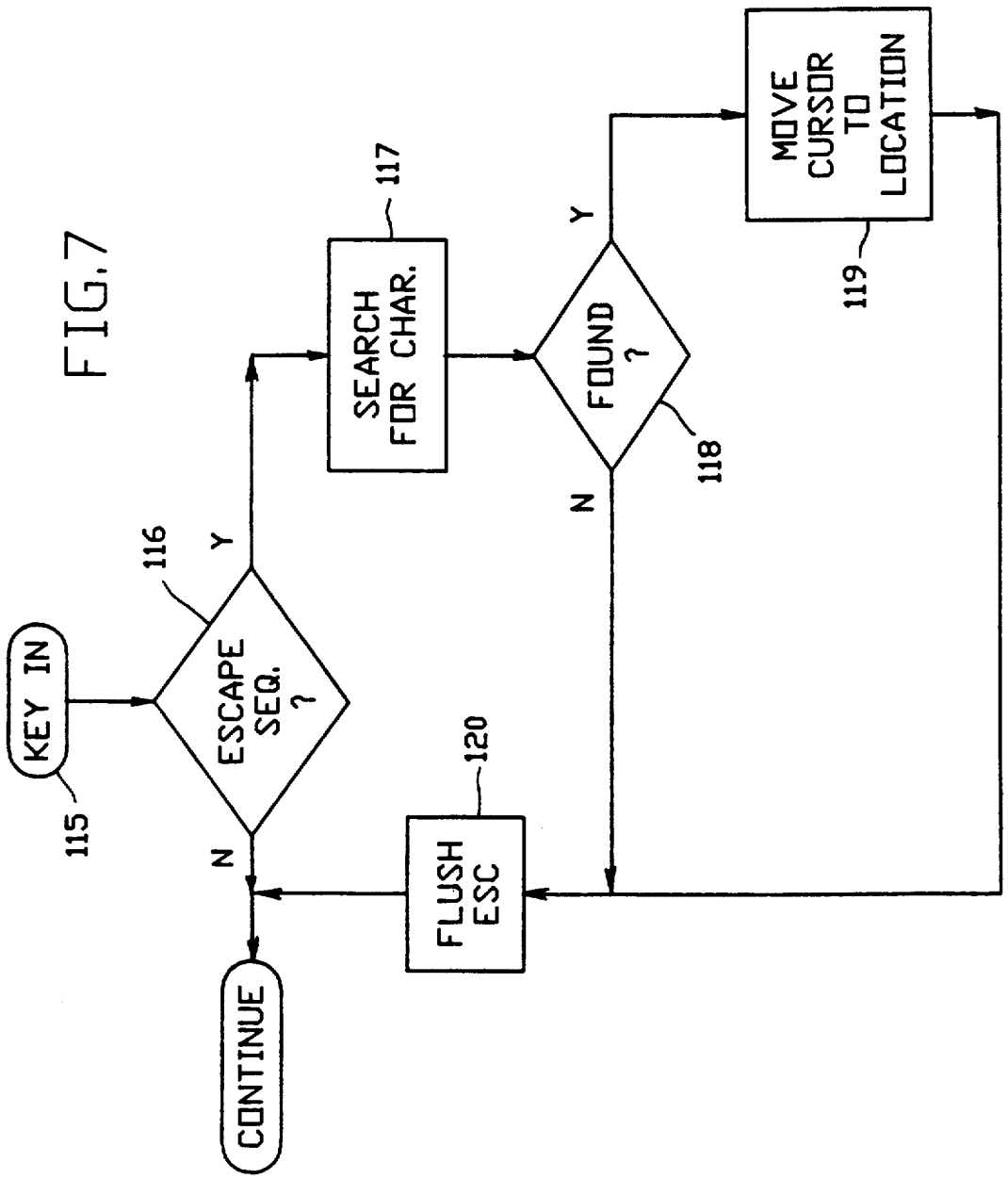

SYSTEM FOR INTEGRATING POINTING FUNCTIONS INTO COMPUTER KEYBOARD WITH LATERAL MOVEMENT OF KEYSWITCH MOUNTING PLATE CAUSING STRAIN AND CONTROL SIGNAL

BACKGROUND OF THE INVENTION

The present invention relates to keyboard operated computing systems. Specifically, an apparatus is described which supports a control function such as a pointing function typically performed by an auxiliary device to be integrated into a keyboard. This device is actuated by exerting a lateral force on the surface of the keyboard key tops.

Keyboard operated computing systems have supported rapid entry of alpha numeric data by providing an efficient tool for this operation to data entry personnel. Computer operations in a graphical environment provided by some computing systems are advantageously manipulated by auxiliary pointing devices which are used to move a cursor from one location on a display to another. In such environment, pointing devices such as "mice" permit screen displayed objects to be identified for some subsequent operation.

The combined use of keyboard data entry systems and pointing devices introduce some inefficiency since the user is required to move his hands from the typing position to a remote, printing-device-operating position. If many pointing operations are required, the interruption to typing operations seriously degrades the data input efficiency of the keyboard.

One approach to making the pointing function more efficient has been to introduce more keys to the keyboard which can be used for cursor manipulation. This uses keyboard space at the expense of implementing other functions. Even with additional keys (usually located on the right side of the keyboard) the keyboard operator is required to remove one hand from the "home" position when shifting from a keystroke operation to a pointing operation, thus reducing typing efficiency.

Incorporation of mouse control features in keyboard devices has been described in various references. In publications entitled "Mouse/Keyboard Concept Incorporating Unique Devices For Control CRT Display Cursors", IBM TDB, Vol. 27, No. 103, March 1985, and "An Integrated Mouse and Keyboard" IBM TDB, Vol. 31, No. 8, January 1989, page 230, the implementation of a mouse on the underside of the base of the keyboard is suggested. Movement of the keyboard over a supporting surface could then be encoded into mouse signals for positioning a cursor. This approach, however, has numerous disadvantages. Among these are a requirement for a larger work space to accommodate movement of the keyboard in four coordinate directions. Additionally, moving the keyboard is physically demanding, and when moved, the keyboard is no longer optimally placed for typing.

U.S. Pat. No. 4,680,577 describes a keyboard which provides at least one key which may be rocked or flexed laterally in addition to being depressed as a conventional keystroke. The rocking motion is encoded to position a cursor on a CRT. The patent suggests the key implementation for two of the "home" keys, such as F or J. The additional problem of emulating mouse buttons is not addressed by this patent, nor is that of inadvertent depression of the pointing key, nor is that of pointing when no finger is on either of these keys.

DISCLOSURE OF THE INVENTION

It is a specific object of this invention to implement a computer selectable function by sensing a lateral force applied in the plane of the tops of the keys of a keyboard by the normally positioned fingertips of the user's hands.

It is another object of this invention to implement a pointing function on a computer keyboard by sensing a lateral force applied in the plane of the tops of the keyboard keys.

It is a more specific object of the invention to implement pointing functions on a standard computer keyboard without changing the number or function of keys in existing keyboard designs and without requiring the keyboard user to move from the positions reached in the normal course of typing.

These and other objects of the invention are provided by a computer keyboard which is implemented with a lateral force detecting device for determining the magnitude and direction of a force which is applied to a surface of the keyboard keys. The sensed force may then be used as a control signal for a computer, such as a pointing function. The pointing function, for example, could position a cursor to a desired position on a CRT. Alternatively, a function may be selected by assigning a function to a given range of forces. Whenever the operator supplies the requisite force, the function is selected by the on-board microprocessor.

The invention may be implemented using a conventional keyboard having a standard key layout and the standard "dishing" of the key tops. The force needed to activate the sensing device may be applied without physically demanding effort since sensor devices which measure small forces are a well-known art. Additionally, the presence of a processor within the keyboard allows the keyboard to make distinctions between lateral forces arising from the user's intent to move the cursor and lateral forces applied inadvertently at the time of keystroke. Each of these events have distinctive force-timing signatures.

The function selected may be a pointing function such as positioning a cursor on a CRT display. In the preferred embodiment of the invention, a force applied to the surface of the key tops, in the plane normal to a keystroke, which also exceeds a threshold force is decoded as a control signal. In this instance the control signal is a request to position the cursor. The operator may supply a sufficient level of force to the key tops in the direction of a choice to position the cursor. The cursor is positioned at a location which is a function of the magnitude of the applied force, the direction of the force, and the duration of the applied force.

The pointing function may be supplemented with a character search feature which permits the operator to position the cursor on a chosen character. Using this feature, the operator first coarsely positions the cursor in the vicinity of the chosen character. The character is then selected by striking the key representing this character. The computer enters a search routine upon detection of the keystroke, and searches for the desired character in the display memory. Once the location of the character is determined, the computer may then accurately position the cursor with respect to this character.

The pointing feature may also be supplemented with a mouse button emulation feature, again using existing keys on the keyboard. The mouse buttons may be simulated by detecting two or more simultaneously depressed keys as a mouse button. The preferred embodiment of this feature senses the depression of any two or more keys to the right of the center of the keyboard as the actuation of the right mouse button, and the simultaneous depression of any two or more keys to the left of center as actuation of the left mouse button. Operation of mouse-driven user interface features of applications or the operating system is then possible from the keyboard.

BRIEF DESCRIPTION OF THE DRAWINGS

FIG. 5 is a flow chart illustrating the software which implements the function of the pointing device of FIGS. 1 and 2.

FIGS. 6A and 6B illustrate the software in the keyboard microprocessor for detecting and implementing pointing operations, as well as supplying normal keyboard operation.

FIG. 7 illustrates an addition to the computer keyboard device driver permitting precise cursor location in response to a selected character being struck on the keyboard during pointing operations.

BEST MODE FOR CARRYING OUT THE INVENTION

Figure 1:
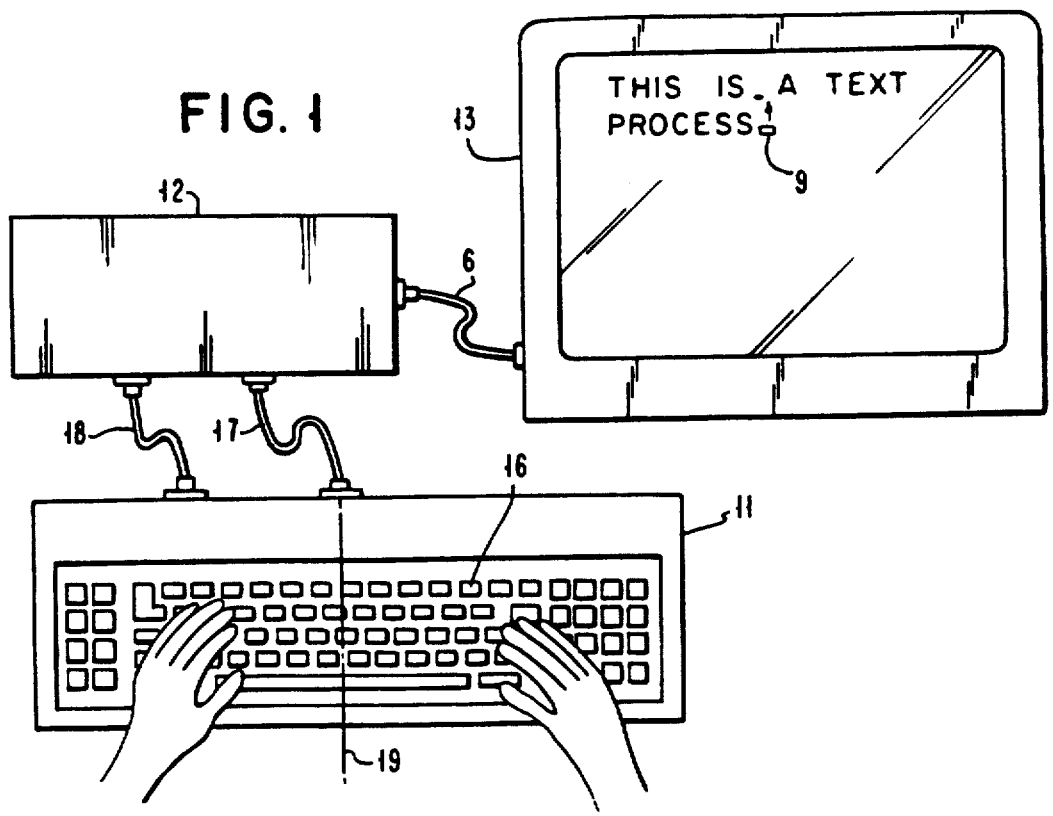
FIG. 1 illustrates a keyboard data entry system incorporating control function apparatus such as pointing apparatus in accordance with the present invention.

Referring now to FIG. 1, there is shown a keyboard operated computer system. The system includes a keyboard 11 implemented in accordance with this invention and connected to a computer 12. The data entry from keyboard 11 is displayed on a CRT display 13 during the normal course of operation of an application program. The keyboard 11 has a layout of keys which is an industry standard.

The keyboard 11 is shown to have a mouse output cable 17 a keyboard output cable 18 as well as a standard encoded output cable 6 to the computer 12. Mouse ports are available on most personal computing systems. Similarly, many application programs have been written to take advantage of pointing and button pressing information supplied through that port. Further discussion of their interface is not necessary.

Using the pointing function provided by a preferred embodiment of this invention, it is possible for the operator who is utilizing an application displayed on the CRT display 13 to move the cursor from one position to another. This movement may be accomplished by applying a force in the plane of the keyboard key tops 16 in a direction corresponding to a desired direction of movement for the cursor. The amount of displacement of the cursor is proportional to the amount of force applied (within design limits) and the time period over which the force is applied in the plane of the keyboard 11 key top surface 16.

Figure 2:
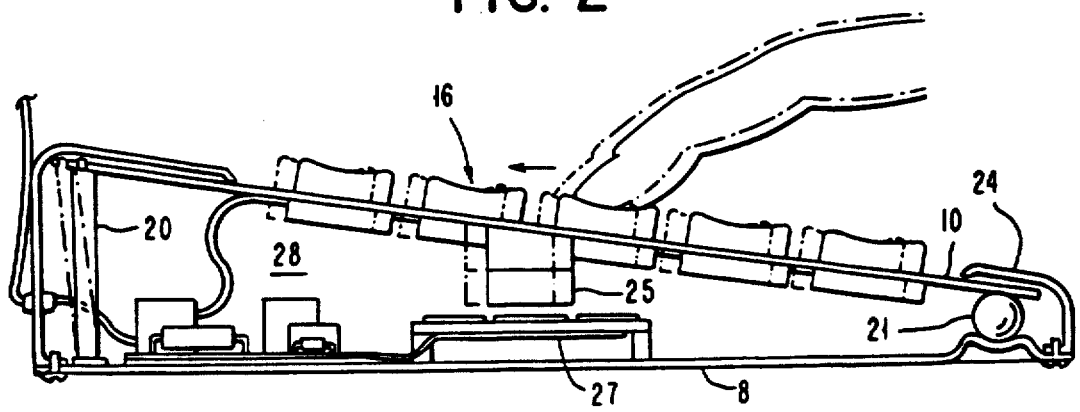
FIG. 2 illustrates how the control function apparatus such as the pointing apparatus of FIG. 1 is implemented within the keyboard.

Referring now to FIG. 2, there is shown how a force applied in the plane of the keyboard key tops 16 may be detected and measured as control signals for subsequent processing into codes which are understandable to a computing system. As FIG. 2 illustrates, it is possible for the keyboard operator to impart a force by pressing the slightly dished keys 16 in a direction corresponding to a desired movement direction for the cursor. The key switch mounting plate 10 is resiliently mounted in the keyboard frame or case 8 and is supported by flexible posts 20 at its distal corners, and a captured bearing 21 at its proximal corners, as seen from the user's point of view. Thus, the slight amount of force imparted by the finger disposed over a key will cause flexing of the posts 20, permitting the keyboard surface 10 to move slightly on the captured bearings 21. This support arrangement can be seen to be adequate to support the switch mounting plate against forces applied in the normal direction during key actuation. It can also be seen that if the stiffness of the posts is correctly chosen, small but detectable displacements of the key switch mounting plate 10 with respect to the keyboard case 8 will result from a user applying force to the key tops in any direction in the plane of the key tops. In the illustration, this movement is in the direction of post 20. Post 20 will be slightly deflected as a consequence of these movements. The proximal corners of the keyboard surface 10 will slide over the captured bearing 21. Despite the loose attachment of the key switch plate, there is no danger of its loss as it is held captive between the bearing surface 21 and a keyboard top bezel 24. Keyboard top bezel 24 is shown as part of a conventional wrap-around chassis, capturing both ends of the key switch mounting plate surface 10. It is to be appreciated that other resilient mountings, such as springs or membranes, may be utilized in the practice of the invention.

Attached to the key switch mounting plate 10 bottom surface is a magnet 25, which will also move when the key switch mounting plate 10 moves. The magnet 25 is disposed over an array of Hall sensors 27, mounted on the keyboard case 8, which can transduce the variations in magnetic field intensity caused by the displacement of the magnet 25 into functionally corresponding changes in their output current. It is to be assumed that these Hall devices are equipped with current to voltage conversion. The array of Hall sensors 27 are arranged as differential pairs so that the orthogonal components of the displacement can be translated into voltage magnitudes by differential amplifiers 30 and 31 in FIG. 3, and encoded into binary number values by A/D converters 33 and 34. These numerical values may, in turn, be used by the keyboard processor 35. It is to be appreciated that other transducers such as strain gauges attached to the resilient mounting or keyboard mounting plate, may be utilized in the practice of the invention. The sensed strain in the resilient mounting or keyboard mounting plate could be utilized to produce a control signal such as a pointing command signal to the keyboard processor 35 from application to the computer 12. Sensing the strain, also contemplates the situation where the keyboard mounting plate is rigidly mounted to the keyboard case.

Figure 3:
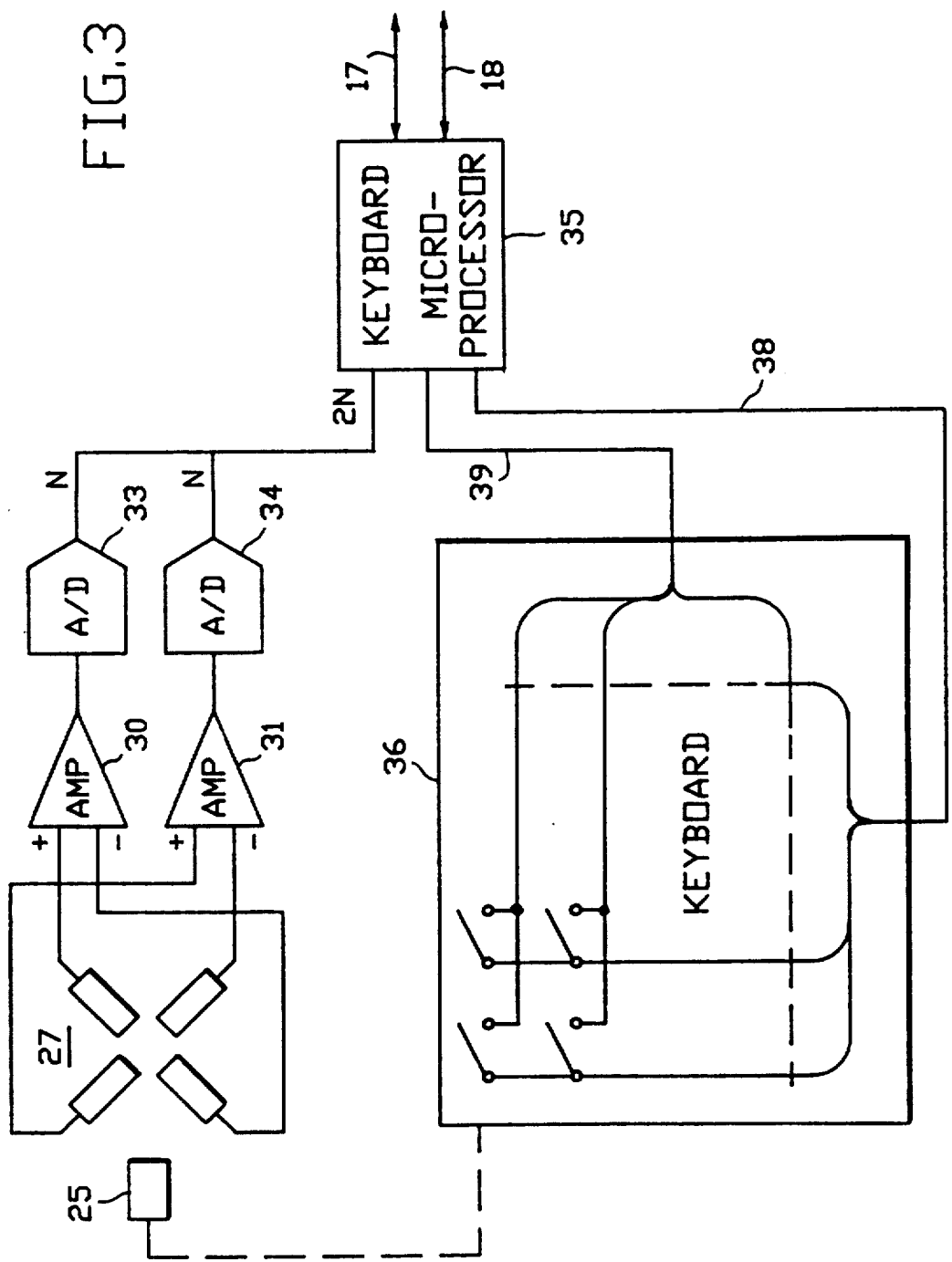
FIG. 3 is a schematic showing how the pointing apparatus may be implemented in accordance with a preferred embodiment of the invention.

The foregoing apparatus may be used as a conventional keyboard as shown in FIG. 1. The operator inputs text as usual via the keyboard 11 which may be displayed on the CRT display 13 by the application receiving the keystroke data. Control information such as commands or data are entered by the generation of a control signal through the application of a force in the plane of the keyboard key tops as described relative to FIG. 2. By way of example, control information in the form of pointing information is now described. To enter the pointing mode, wherein data in the form of, for example, mouse data, is supplied to the application program, a force is applied in the plane of the keyboard key tops of FIG. 2, resulting in a displacement of the key switch mounting plate 10 of a magnitude related to that force. This displacement is also exerted upon the magnet 25 of FIG. 3. A control signal is thus produced from Hall sensor array 27 in the form of a change in output voltage. The common mode of the output voltage of each of the differential pairs of Hall sensors of FIG. 3 is rejected by operational amplifiers 30, 31 leaving only component voltages arising from movement in the axis of that pair. This voltage is converted into microprocessor readable digital numerical quantities by A/D converters 33, 34. These quantities are used by a program executing on microprocessor 35 to determine which control function has been called for by the user. In this instance, to determine whether or not a pointing operation has been performed by the user. In the event that that software was providing keystroke information to the application program executing in the computer 12 of FIG. 1, the program executing in microprocessor 35 of FIG. 3 will respond to these quantities by changing its flow of control to cause pointing information to be sent to the aforementioned application.

Figure 4:
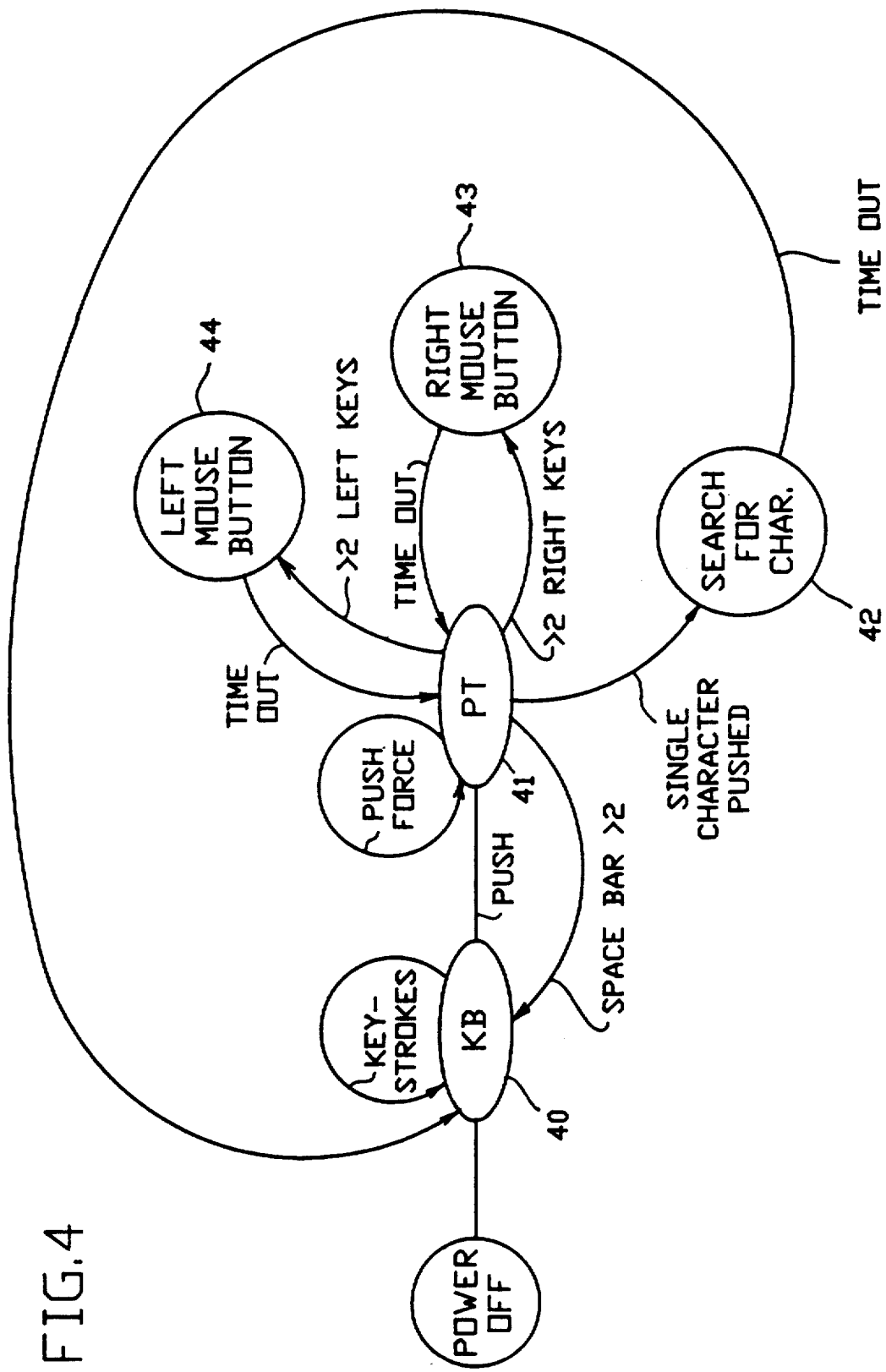
FIG. 4 is a state diagram demonstrating how the operations performed by a user on the keyboard change the operating state of the keyboard so that it can be used as either a keyboard or a pointing device.

The operations performed on the basis of the signal level are accomplished with electronic circuitry 28 of FIG. 2 to be described with respect to the state diagram of FIG. 4, associated with the on-board keyboard microcomputer. Once the user has complete sending pointing information, it is possible to return to the text mode by entering a space bar depression, or other (possibly user-defined) keystrokes.

The foregoing function of developing pointing data makes use of the detection of a force applied to the key top surfaces for switching to the pointing mode. It is possible, using the principles of the present invention, to select other functions in addition to pointing upon the sensing of a force in the direction of the plane of the key top surfaces. These other functions can be similarly encoded wherein the direction of the force, and duration and magnitude of the force may be used to initiate other functions in the computer. It is also possible to build keyboards with integrated pointing device capabilities based on the principles of this invention which utilize techniques other than those described herein for the suspension of the key switch mounting plate and the measurement of the force thereon, without departure from the spirit of the invention.

It is also possible, and advisable in certain instances, to use the foregoing embodiment in connection with a mouse function. The pointing accomplished by the apparatus shown in FIGS. 1 and 3 is advantageous in that a typist/computer user need not move fingers from the text entry position to supply pointing information to the computer application program. In conventional pointing device systems, a separate pointing device is used, requiring data entry persons to move their hands, or (at best) some fingers, from the text entry position to a dissimilar pointing device operating position. To take advantage of the foregoing feature, permitting the hands to remain on the keyboard, it is necessary to provide a means to simulate the mouse button functions on the keyboard and pointing system of FIGS. 1 and 2.

These functions may take the form of detecting while in the pointing mode, when more than one key in a defined group of keys such as keys on either side of the centerline 19 have been simultaneously pressed. Thus, to operate a mouse button, the operator may consider the right and left hand sides of the keyboard as two distinct mouse buttons. During operation, when it is desired to send information to the application in accordance with conventional mouse button control, the user need only be certain that two keys be depressed on either side of the keyboard at substantially the same time to signal the program executing in the keyboard processor that the signal associated with closure of a mouse button should be sent to the application software.

Associated with the keyboard is an array of keyboard switches 36 which are scanned in the conventional manner by virtue of X and Y signal buses connected to the keyboard array 36. These keyboard buses 38 and 39 will allow detection of key depressions and identification of which of the keys may have been selected.

The optional embodiment wherein mouse buttons may be emulated by the simultaneous depression of at least two keys on either side of the keyboard 11 may be used to simulate the closures of conventional first and second mouse buttons. This, along with data encoding pointing operations in the manner of a conventional mouse, supply the signal provided on a second cable 17 to the mouse input port of the computer 12.

The keyboard microcomputer 35 provides standard keyboard encoded signals on cable 18 to the computer 12. In the case that the computer 12 has no mouse port, the keyboard microprocessor may output the control signals generated by forces applied in the plane of the key tops as cursor key strokes. This encoded information would be supplied to computer 12 by the keyboard connection 18.

It is clear that the keyboard microcomputer 35 can distinguish the multiple key depressions sensing the operation of a mouse button and encode the same as a mouse operation. The keyboard microcomputer 35 can distinguish between forces applied to the keyboard, which are intended to be pointing commands from an inadvertent force which may have been applied to the keyboard surface 10, while entering a normal keystroke by examining both the time/magnitude profile of the force, and its coincidence with a keystroke.

With the embodiments shown, it is possible to provide a search mode to accurately position a coarsely positioned cursor 9 with respect to a text character on the CRT display 13. As shown in FIG. 1, the cursor can be positioned by supplying positioning information to the application software. It is assumed by way of this example that the application presents a text mode interface, and thus that the keyboard provides positioning information in the form of cursor move key codes. In order to position the cursor 9 in coincidence with a letter of text, the cursor is first positioned near the desired character, following which a search may be triggered. This search may be started by a single key depression corresponding to the displayed alpha numeric character at the desired position for the cursor 9. Thus, if the operator had located the cursor 9 in the position between the S and A of the first line of text, by depressing the letter I, the computer may begin a search procedure to look at all the positions in the vicinity of the cursor in the text memory for the letter I. As memory locations nearby contain two letters I, the computer would identify the closest memory location having the letter I, i.e., the first letter of the word "is", and position the cursor 9 in coincidence with the closest found letter I. This would then permit a subsequent keystroke to overtype the letter I or insert a character before the I, in accordance with the state of the keyboard (insert or overwrite). In this example it is essential that the user position the cursor closer to the particular "I" desired than to any other "I". Clearly, software may be written which deals with equidistant target characters.

This search routine may be employed with or without the mouse function. To leave the pointing function and search function, it is possible to hit the space bar, which will be decoded as a request to leave the pointing mode and reenter a text only mode. The search routine is not available in the text only mode.

The various modes of operation for the embodiments described are summarized in the state diagram of FIG. 4. These modes of operation include a keyboard state 40 which the machine assumes after being powered up. A force or push given to the keyboard key tops 16 puts the device in a control mode such as the pointing mode 41, in which the push is converted to pointing information. A particular control mode is implemented by the keyboard microprocessor software. When in the pointing mode, all subsequent forces applied to the surface of the key tops will be converted to pointing information.

If the user wishes to indicate either the right or left mouse button function 43, 44, a pair of keys on the right or left of the keyboard centerline will be concurrently or simultaneously depressed. Once the simultaneous depression has been detected as a mouse command, the system automatically returns to the pointing mode after a short time out period, so the subsequent release of the keys located on the right or left of the keyboard will be detected as a mouse button release. Thus, pointing information can continue to be collected while the mouse buttons are depressed. This supports the mouse "drag" operation common on "pull-down" user interfaces.

To leave the mouse mode or pointing mode, it is only required that the space bar be depressed.

When in the pointing mode, and a single character is depressed on the keyboard, the search mode is entered in state 42 to look for a character in the vicinity of the positioned cursor. Once that character is located, the cursor is moved to the character position, and the keyboard state 40 is re-entered. This permits text composition to continue once the character is located, and the cursor is moved to that location. In the event the character is not found within some preset time period or distance, the cursor is left where it is and the keyboard state 40 is re-entered.

Figure 6A:
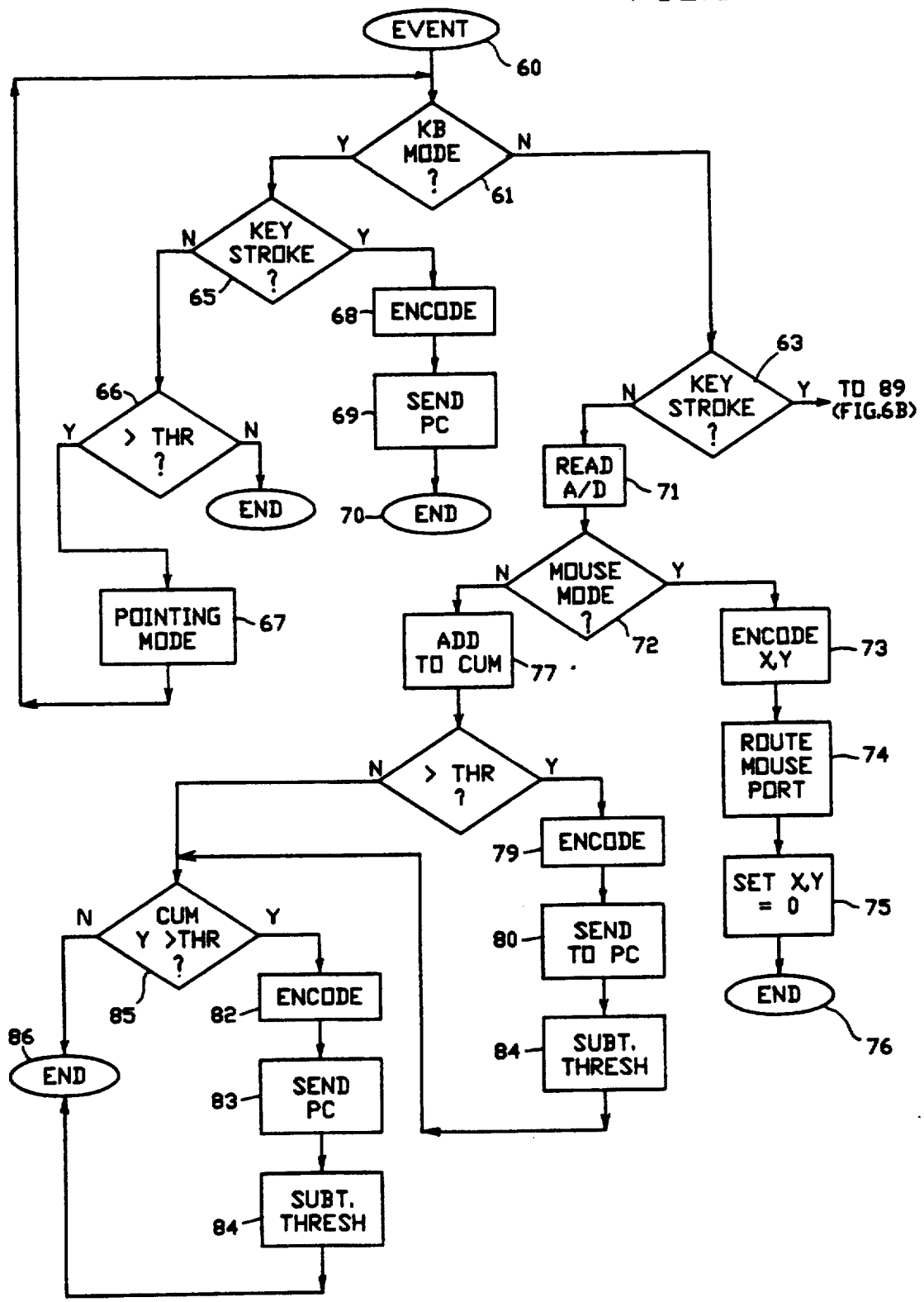

In implementing the foregoing embodiment of the invention, both the keyboard microprocessor 35 as well as the computer 12 microprocessor, must be programmed accordingly. FIGS. 6A and 6B represent the programming steps implemented in the keyboard microcomputer 35. FIG. 7 illustrates a fragment of a program in the computer 12, necessary for integrating the screen character search into the computer keyboard handling program, for accomplishing a search for a character in the vicinity of the cursor. FIG. 5 illustrates the overall program architecture in the keyboard microprocessor 35 of FIG. 3 for implementing these functions.

Referring now to FIG. 5, there is shown the overview organization of the software in the keyboard microprocessor 35, which permits implementation of the foregoing control functions such as pointing, mouse and search functions. Following power up 50 of the computer 12 and keyboard 11 of FIG. 1, a power on self-test routine is executed in 51, as is conventional in computer processing systems, such as personal computers. Upon successful completion of the self-test, the mode is set in block 52 as the keyboard mode. To begin the keyboard mode, initialization data is loaded in step 53 from the computer 12, which identifies parameters for the mouse, such as threshold, and whether mouse data or cursor key codes are to be used to provide positioning information to applications. The loaded data is then used to initialize the keyboard microprocessor 35 of FIG. 3 in step 54 in accordance with this selected data.

At this point, the keyboard may be used to enter either text in the conventional keyboard entry mode or text composition mode or in any of the foregoing control functions such as pointing or mouse modes. If a keyboard event is detected at step 55, that event is processed, as shown in FIGS. 6A and 6B When either a key depression occurs in the keyboard entry mode or a lateral force is applied to the surface of the keyboard key tops in the control function mode, the event enables processing of the event in step 56. Step 56 comprises a series of steps, as shown in FIGS. 6A and 6B, which encodes and transfers the event to the computer as either a keyboard entry mode function or a control mode function such as a cursor move key depression, a keystroke or mouse data stream.

Following the processing of an event in step 56, the decision block 57 determines whether or not any new parameters have been loaded by the host which require reinitialization. In the simplest case it is assumed that there have been no new parameters during one session of use of the device.

Referring to FIG. 6A, there is shown a flow chart illustrating the program steps executed by the keyboard microprocessor 35 to process a keyboard event and encode the same.

The user's actions on the keyboard cause an event 60 which may either be a keyboard mode or a control mode. The event handling routine begins by determining whether or not the keyboard is in the keyboard mode. If the device is in the keyboard mode, decision block 61 causes the flow of control to pass to decision block 65. This determines whether or not a keystroke has been made. The other possible event is the control mode which is entered in response to the application of a force of a predetermined level in the plane of the key top surface. If such force is not detected, or is detected coincident with a keystroke, the keystroke is encoded in step 68, and sent to the PC in step 69. Each such keystroke provides the basic text composition of the prior art. Following transmission of the keystroke 69, the event handling routine exits 70. This is the exit point of the process block routine 56 of FIG. 5.

Assuming a new event has caused the event handler routine to be entered, and that the keyboard is in the keyboard mode, decision block 61 again causes the flow of control to pass to decision block 65. If a force is detected on the surface of the keyboard, then decision block 65 causes the flow of control to pass to decision block 66. Decision block 66 determines whether or not this is above a threshold for operation of a control mode such as the pointing mode. Assuming that it is above the threshold, the pointing mode is entered in step 67 by changing an item in the data structure maintained by the keyboard microprocessor from the condition which indicates keyboard mode to the condition which indicates pointing mode. If the event is not above a predetermined level such as the required threshold, set at initialization 54 of FIG. 5, the event handling routine is exited at 67a.

Once in the pointing mode, control passes via decision block 61 and is routed to decision block 63 as the keyboard is now in the pointing mode and not in the keyboard mode. Decision block 63 routes control to step 71, since a keystroke has not been detected, wherein each of the analog to digital converters 33, 34 of FIG. 3 is read. This provides a reading indicative of the amount of force in each of two coordinate directions detected by the Hall devices in the hall sensor 27. Assuming that the mouse mode has not been selected, as determined in decision block 72, these readings are added to cumulative totals of X and Y force measurements in step 77, X and Y denoting each of the directions in which the pair of differential Hall devices are oriented. In decision block 78, it is determined whether or not the cumulative amount of force over time exceeds that of a threshold or predetermined level. If so, the value is encoded in step 79. The encoded displacement along the axis X is sent in 80 to the PC keyboard port in the form of cursor movement keystroke codes as the mouse mode has not been set. The portion of the accumulated X value is subtracted in step 81 from the cumulative total to establish a new, correct cumulative X. Control is then passed to decision block 85 to deal with the cumulative Y count is the same way. Control would have also been passed to decision block 85 if the cumulative X count had not exceeded the threshold as determined at decision block 78.

A similar encoding of force detected along a Y axis is affected. In decision block 85, the cumulative total of force measured along the axis defined by the orthogonal pair of Hall devices shown in FIGS. 2 and 3 is compared against a threshold or predetermined level. If this threshold is exceeded, the result is encoded in step 82 and sent to the PC in step 83. The encoded quantity is then subtracted from the cumulative total in step 84, and the event handler is then exited in 86. If the Y threshold value was not exceeded in decision block 85, the event handler is likewise exited at step 86. Thus, each force measurement while in the pointing mode is encoded as cursor movement keystrokes, identifying the amount of displacement in two orthogonal directions for the cursor.

Returning to decision block 72, had the mouse mode been set to ON during the keyboard initialization, control passed at this point to step 73 to encode the content of the cumulative X and Y counts as a mouse data stream format datum. This datum is routed to the mouse port of the PC at step 75 and the event handler is exited at 76.

Referring now to FIG. 6B, there are shown additional steps executed by the keyboard microprocessor 35 when executing the event handler in the pointing mode to effect a simulation of two mouse buttons, or send a message requesting a search for a nearby character, or to effect a return to the keyboard mode. Assume for this example that the user has depressed one or more keys. If one key is depressed which is the space bar, then decision block 89 routes the control flow of the program to function 94 which takes the system out of the control mode, in this instance the pointing mode and returns it to the keyboard mode. Following this mode change, the event handler returns control as shown in block 95.

In the event that the keystroke or strokes effecting the program control flow at decision block 89 is a character key other than the space bar, decision block 88 determines whether a single key or multiple keys were depressed. If a single key was depressed control flow is routed to block 90 and an escape code message is sent to the PC in step 90. After this message is sent, the event handler is exited 91 in the familiar manner. The escape code message is received by the keyboard interrupt handler of the PC, and contains the character to be searched for among the displayed text. The keyboard interrupt handler in the PC can be conventional except insofar as its behavior when the escape message is received.

Refer briefly to FIG. 7 which shows the additional program flow control needed to process keyboard streams containing escape messages. As will be evident with respect to FIG. 7, the computer 12, upon receiving this message, conducts a search 117 to locate a character identified by the keystroke, within the display memory, which is closest to the coarsely positioned cursor. This search can be performed by any of several methods commonly known to those skilled in the art.

Having completed the search, this routine reaches decision block 118 where, if the search is successful, the move cursor routine 119 positions the cursor. If the search is unsuccessful, the keyboard buffer 120 is flushed of the escape sequence without any cursor repositioning. The remainder of the keyboard interrupt handler may then execute according to its control flow.

Returning to decision block 99 of FIG. 6B, it is determined the system is in the mouse mode. In this instance control flow is routed to decision block 100, where the decision is made whether or not most of the depressed keys are on the left or right of the centerline, thereby identifying whether or not a left or a right mouse button has been selected. These determinations result in commands being sent to the computer, assuming the mouse mode is ON. In step 101, a left mouse button command is sent to the PC mouse port and in step 103, a right mouse button command is sent to the PC mouse port. In either case, the event handler is exited in the familiar manner in step 102 or step 104.

If at 99 the keyboard were not in mouse mode, the multiple key depression would represent a user error and would result in an exit with no action taken.

It should be clear to those skilled in the art that the rudimentary functions described herein can be easily expanded to provide more sophisticated pointing device functions, such as "double clicks", mice with more than two buttons, and dragging functions. These elaborations should not be viewed as departures from the spirit of this invention.

Thus, it can be seen that by using the foregoing apparatus it is possible to provide for efficient keyboard operation using standard keyboard entry, as well as control function entry such as pointing and mouse functions, without incurring major inefficiencies. Operators may thus operate keyboards without moving their hands from the standard typing position, and yet have pointing functions immediately available as if a mouse were in hand, without great physical exertion and without disturbing the efficiency of typing through the keyboard.

There has now been described with respect to several embodiments, apparatus which establishes a different control function for a keyboard by sensing the presence of a lateral force having a given or predetermined range of magnitudes. This may be implemented as one of many control functions or pointing functions such as a cursor movement or mouse function, permitting mouse functions to be emulated without additional keys or unfamiliar manual operation. Those skilled in the art will recognize yet other embodiments, defined more particularly by the claims which follow.

Having thus described my invention, what I claim as new and desire to secure by Letters Patent is:

1. A keyboard and computer system for user entry of text and control functions comprising:
   a keyboard case;
   resilient mounting means connected to said keyboard case;
   a keyswitch mounting plate including a plurality of keys, each of which is vertically displaceable in response to the application of a vertical force by a user, with said keyswitch mounting plate being connected to said resilient mounting means such that the application of a lateral force to any one of said plurality of keys produces a lateral movement of said keyswitch mounting plate with respect to said keyboard case;
   a first sensor coupled to one of said resilient mounting means and said keyswitch mounting plate for producing a control signal in response to sensing lateral movement of said keyswitch mounting plate;
   a second sensor coupled to said plurality of keys for producing a different coded keyboard signal indicative of a character or command in response to the vertical depression of each different one of said plurality of keys;
   a computer coupled to said first and second sensors, which is responsive to said control signal for executing a predetermined control function, and which is responsive to each of the different coded keyboard signals for producing decoded keyboard signals; and
   a display device coupled to said computer, on which characters are displayed in response to the decoding of keyboard signals by said computer, and on which other indicia is manifested in response to the execution of said predetermined control function by said computer.

2. The combination claimed in claim 1, wherein said control signal is one of a command signal and a data signal.

3. The combination claimed in claim 2, wherein said command signal is a pointing command signal.

4. The combination claimed in claim 3, wherein said pointing command signal is a mouse command signal.

5. The combination claimed in claim 3, including:
   means responsive to the concurrent vertical depression of any two of said plurality of keys belonging to a first predefined group of keys as a first pointing command signal and the concurrent vertical depression of any two of said plurality of keys belonging to a second predefined group of keys as a second pointing command signal.

6. A method of operating a keyboard and computing system including a keyswitch mounting plate which is resiliently mounted on a keyboard case, with said keyswitch mounting plate including a plurality of keys, each of which is vertically displaceable in response to the application of a vertical force by a user to produce keyboard signals when in a keyboard mode of operation, with lateral movement of said keyswitch mounting plate relative to said keyboard case being produced in response to the application of a lateral force to any one of said plurality of keys by the user for producing control signals when in a control mode of operation, and for providing the keyboard signals to a computer when in the keyboard mode of operation and the control signals to the computer when in the control mode of operation, said method including the steps of:
   beginning operation in the keyboard mode of operation;
   switching to the control mode of operation as the result of the production of said control signals in response to sensing the application of a lateral force greater than a threshold level to at least one of the keys for execution of a predetermined control function by said computer; and
   returning to the keyboard mode of operation as the result of the production of said keyboard signals in response to the application of a vertical force to a predetermined one of the keys.

7. A keyboard and computer system for user entry of text and control functions comprising:
   a keyboard case;
   resilient mounting means connected to said keyboard case;
   a keyswitch mounting plate including a plurality of keys, each of which is vertically displaceable in response to the application of a vertical force by a user, with said keyswitch mounting plate being connected to said resilient mounting means such that the application of a lateral force to any one of said plurality of keys produces a strain in said keyswitch mounting plate or said resilient mounting means;
   a first sensor coupled to one of said resilient mounting means and said keyswitch mounting plate for producing a control signal in response to sensing a strain in said keyswitch mounting plate or said resilient mounting means;
   a second sensor coupled to said plurality of keys for producing a different coded keyboard signal indicative of a character or command in response to the vertical depression of each different one of said plurality of keys;
   a computer coupled to said first and second sensors, which is responsive to said control signal for executing a predetermined control function, and which is responsive to each of the different coded keyboard signals for producing decoded keyboard signals; and
   a display device coupled to said computer, on which characters are displayed in response to the decoding of keyboard signals by said computer, and on which other indicia is manifested in response to the execution of said predetermined control function by said computer.

8. The combination claimed in claim 7, wherein said control function is a pointing function.

9. The combination claimed in claim 8, wherein said pointing function is a mouse function.

10. The combination claimed in claim 9, including:
    means responsive to the concurrent vertical depression of any two of said plurality of keys belonging to a first predetermined group of keys as a first mouse button command and the concurrent vertical depression of any two of said plurality of keys belonging to a second predetermined group of keys as a second mouse button command.

11. A method of operating a keyboard and computer system including a keyswitch mounting plate which is resiliently mounted on a keyboard case, with said keyswitch mounting plate including a plurality of keys, each of which is vertically displaceable in response to the application of a vertical force by a user to produce keyboard signals when in a keyboard mode of operation, with a strain being produced in said keyswitch mounting plate or said resilient mounting means in a response to the application of a lateral force to any one of said plurality of keys by the user for producing control signals when in a control mode of operation, and for providing the keyboard signals to a computer when in the keyboard mode of operation and the control signals to the computer when in the control mode of operation, said method including the steps of:

beginning operation in the keyboard mode of operation;

switching to the control mode of operation as the result of the production of said control signals in response to sensing a strain in said keyswitch mounting plate or said resilient mounting means as the result of the application of a lateral force greater than a threshold level to at least one of the keys for execution of a predetermined control function by said computer; and returning to the keyboard mode of operation as the result of the production of said keyboard signals in response to the application of a vertical force to a predetermined one of the keys.

* * * * *